United States Patent [19]

Stolzer

[11] Patent Number: 5,348,319
[45] Date of Patent: Sep. 20, 1994

[54] CHUCK UTILIZING CAM
[75] Inventor: J. Timothy Stolzer, Pickens, S.C.
[73] Assignee: Ryobi Motor Products Corporation, Easley, S.C.
[21] Appl. No.: 83,369
[22] Filed: Jun. 25, 1993
[51] Int. Cl.$^5$ .................................. B23B 31/103
[52] U.S. Cl. ........................... 279/77; 279/46.1
[58] Field of Search .................. 279/76, 77, 78, 43.4, 279/46.1–46.6

[56] References Cited

U.S. PATENT DOCUMENTS

| | | |
|---|---|---|
| 8,315 | 8/1851 | Niles . |
| 33,899 | 12/1861 | Morrill .................... 279/77 |
| 77,219 | 4/1868 | Rundlett . |
| 111,265 | 1/1871 | Shoemaker . |
| 273,409 | 3/1883 | Voos . |
| 299,886 | 6/1884 | Westbrook . |
| 315,326 | 4/1885 | Parsons . |
| 374,743 | 12/1887 | Jones . |
| 460,922 | 10/1891 | Minnich . |
| 668,395 | 2/1901 | Stirckler . |
| 725,346 | 4/1903 | Krug . |
| 770,399 | 9/1904 | Strutz . |
| 781,761 | 2/1905 | Binnie . |
| 854,512 | 5/1907 | Mapes . |
| 922,429 | 5/1909 | Hollm . |
| 965,893 | 8/1910 | Hanson . |
| 1,053,093 | 2/1913 | Gilman . |
| 1,140,978 | 5/1915 | Hart . |
| 1,273,417 | 7/1918 | Smith . |
| 1,450,189 | 4/1923 | Smith . |
| 1,492,792 | 5/1924 | Gordon et al. . |
| 1,765,362 | 6/1930 | Berry . |
| 1,783,541 | 12/1930 | Hogg et al. .................... 279/77 |
| 1,828,862 | 10/1931 | Hansen . |
| 2,360,908 | 10/1944 | Stoner . |
| 2,438,797 | 3/1948 | Bagge . |
| 2,470,218 | 5/1949 | McNamara . |
| 2,479,405 | 8/1949 | Ramsey . |
| 2,500,420 | 3/1950 | Koning .................... 279/76 |
| 2,500,491 | 3/1950 | Hampton . |
| 2,535,951 | 12/1950 | Parigian . |
| 2,676,809 | 4/1954 | Smith . |
| 2,689,740 | 9/1954 | Parigian . |
| 2,695,787 | 11/1954 | Sunnen . |
| 2,710,193 | 6/1955 | Baron . |
| 2,793,041 | 5/1957 | Barbier et al. . |
| 2,817,532 | 12/1957 | Hohwart et al. . |
| 2,896,956 | 7/1959 | Ann . |
| 2,935,329 | 5/1960 | Hessler . |
| 2,938,698 | 5/1960 | Johnson . |
| 2,996,301 | 8/1961 | Cox . |
| 3,091,474 | 5/1963 | Boutros et al. . |
| 3,171,665 | 3/1965 | Brauer . |
| 3,281,170 | 10/1966 | Kaplan . |
| 3,791,661 | 2/1974 | Giles . |
| 3,820,801 | 6/1974 | Lindler . |
| 3,837,661 | 9/1974 | Phillippi . |
| 3,947,048 | 3/1976 | Hubbell . |
| 4,211,510 | 7/1980 | Hopkins . |
| 4,575,293 | 3/1986 | Berti . |
| 4,804,197 | 2/1989 | Drbal . |
| 4,809,995 | 3/1989 | Ramunas .................... 279/77 |
| 4,869,136 | 9/1989 | Easter et al. . |
| 4,896,892 | 1/1990 | Andrews . |
| 4,958,966 | 9/1990 | Andrews . |
| 5,044,643 | 9/1991 | Nakamura . |
| 5,096,212 | 3/1992 | Walsh .................... 279/83 X |
| 5,158,407 | 10/1992 | Zetti . |
| 5,191,968 | 3/1993 | McCurry . |

FOREIGN PATENT DOCUMENTS 227620 7/1987 European Pat. Off. ............. 279/77

OTHER PUBLICATIONS

The Art of Woodworking Portable Power Tools, pp. 69–73, Time–Life Books (1992).

Primary Examiner—Steven C. Bishop

[57] ABSTRACT

A chuck for securely holding a cutting tool while being rotated by a driving apparatus. The chuck includes a chuck body defining a tool bore into which the cutting tool may be inserted. A cam assembly is pivotally mounted to the chuck body and operably extends into the tool bore. An actuator cooperates with the chuck body and is positionable to operate the cam to secure or release the cutting tool, within the tool bore. In an alternative embodiment, a collet is used and the cam and actuator operate to secure or release the collet, and any cutting tool inserted into the collet, within the bore.

20 Claims, 1 Drawing Sheet

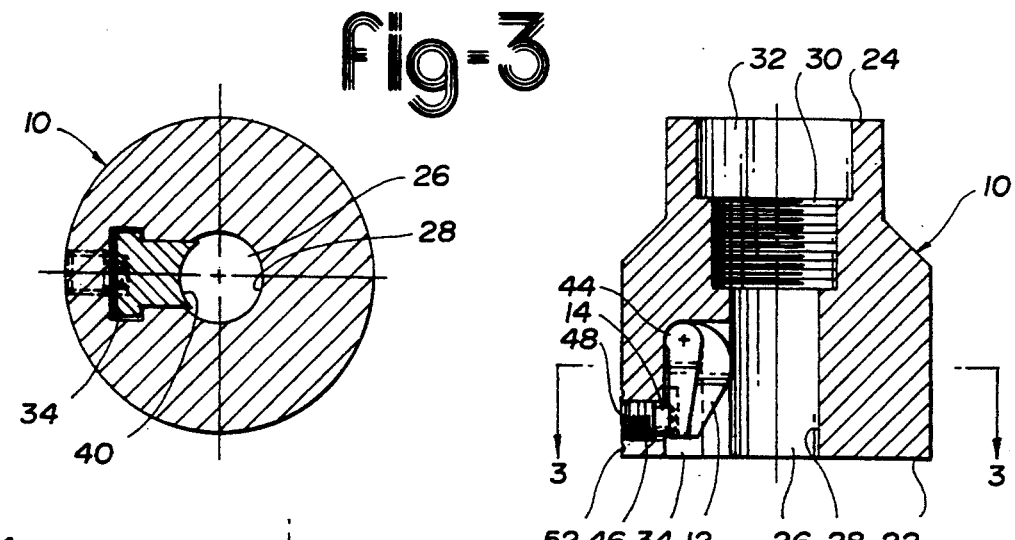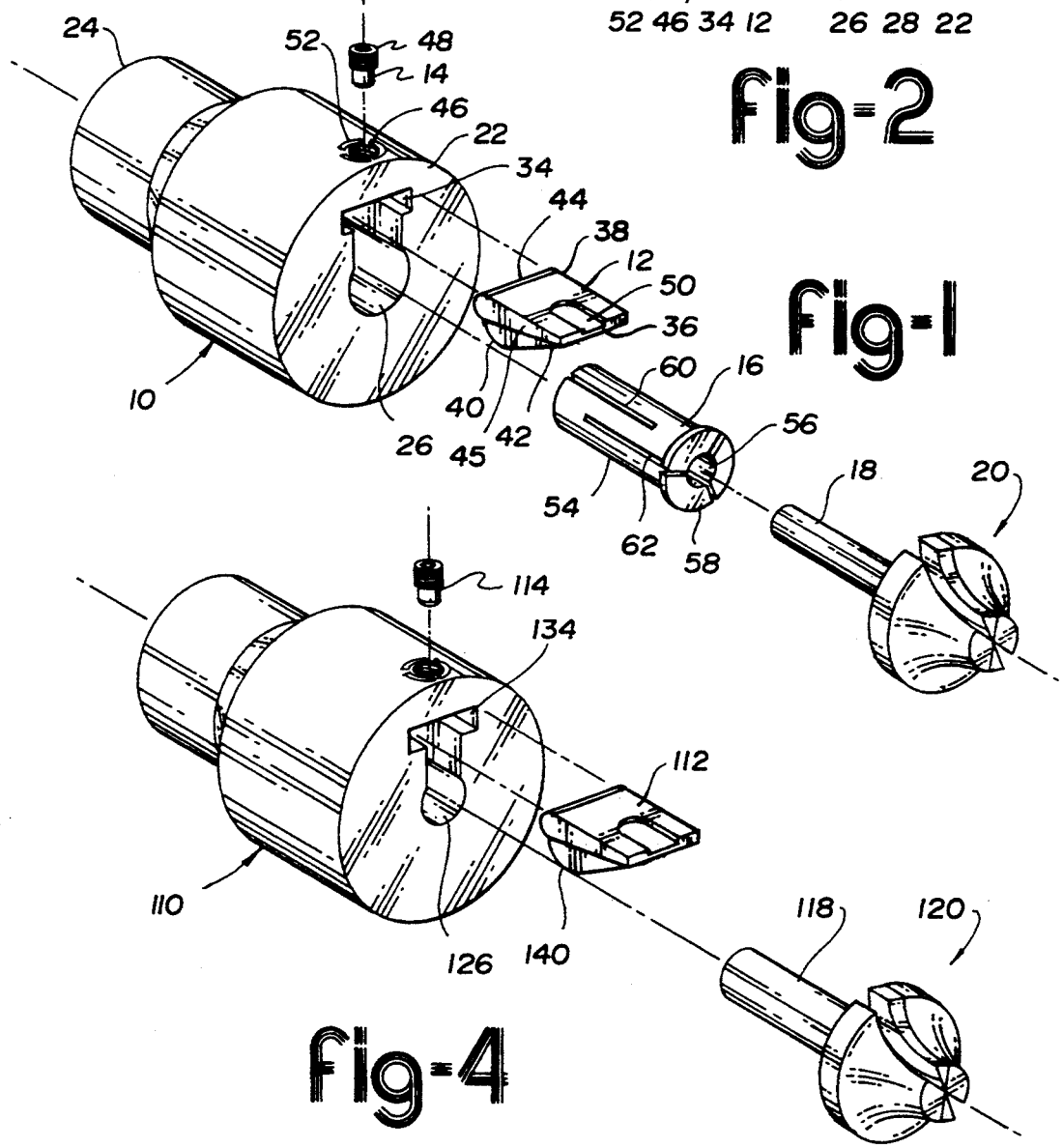

CHUCK UTILIZING CAM

TECHNICAL FIELD

The present invention relates to an improved chuck for use with power or hand driven tools and, more particularly, to an improved mechanism for holding cutting tools within such a chuck.

BACKGROUND ART

In power tools, such as a router, an internal motor has a rotating shaft. The shaft is coupled to a chuck for receiving a cutting tool at the exposed end. Cutting tools of varying characteristics are selectively installed in, or removed from, the chuck depending on the job being performed by the user.

Conventional high-speed power tools such as routers often employ collet-type chucks attached to the shaft of the power tool. Such collet-type chucks have flexible jaws which may be opened or closed through the use of a rotary nut. The disadvantage with such a chuck mechanism is that the shaft of the router, onto which the collet is coupled, must be held stationary while the rotary nut is loosened or tightened.

There are generally two types of prior art collet-type chucks used. The first requires the user to use two wrenches, one to hold the shaft stationary while the other is used to turn the rotary nut. For a general description of a router utilizing such a chuck, and its use, the reader is referred to *The Art of Woodworking Portable Power Tools*, at 69–73 (Time-Life Books 1992). In the second alternative, the power tool includes a locking device which will lock the shaft in place when it is desired to change cutting tools by loosening and tightening the rotary nut. An example of a router using a shaft locking device is disclosed in U.S. Pat. No. 5,191,968 which issued on Mar. 9, 1993 to McCurry.

A disadvantage inherent in the conventional chucks described is the requirement that the shaft of the tool be locked before the cutting tool can be changed. Attempts have been made in the past to develop a chuck which would eliminate the need to lock the shaft of the driving apparatus in order to change cutting tools. However, in many cases, these prior art chucks do not adequately secure the cutting tool to the driving apparatus. This is especially true when such chucks are used in conjunction with high-speed power tools, such as modern day routers, which typically operate at speeds up to 25,000 rpm. Also, many of these prior art chucks require the user to apply a great amount of force in order to secure the cutting tool in the chuck. Furthermore, such prior art chucks are oftentimes complex in design and expensive to manufacture. Finally, none of these chucks suggest the mechanism disclosed and claimed in this specification, nor do they provide the same advantages. A couple of those patents are briefly reviewed here to show the state of the art.

U.S. Pat. No. 2,676,809 issued on Jun. 18, 1953 to Smith discloses a "Tool Holder Bushing." The mechanism disclosed incorporates two identical metal halves which are held together by a pair of spring rings to form a bushing which is then placed in a drill chuck. after a cutting tool shank is inserted into the bushing, a set screw threaded through the wall of the drill chuck forces the two halves of the bushing together, thereby clamping the cutting tool.

U.S. Pat. No. 5,096,212 issued on Mar. 17, 1992 to Walsh discloses a "Chuck For Power Tools." The mechanism disclosed includes a first tool bore into which a collet or a cutting tool shank is inserted and a second bore intersecting that first tool bore. Within the second bore are two clamping elements which may be drawn together into a clamping relationship upon the collet into which a cutting tool shank has been inserted, or upon the cutting tool shank directly, thereby securing the cutting tool shank within the chuck.

None of these prior art chucks employ a device which is not only easy to manufacture, but capable of securely retaining the shank of a cutting tool easily and without the exertion of undue force. More specifically, none of these prior art patents disclose a camming mechanism or any other mechanism designed to use leverage to increase the clamping forces upon the collet or cutting tool shank. Accordingly, there remains a need for a simple mechanism by which cutting tools may be easily, quickly and securely retained within a chuck.

SUMMARY OF THE INVENTION

An object of the present invention is to provide a relatively simple chuck mechanism for securely fastening a cutting tool to a driving apparatus.

In carrying out the above objects, and other objects and features of the present invention, an improved chuck is provided. The chuck comprises a chuck body having a drive end for permanently or removably attaching the chuck body to the driving apparatus. The chuck body also has a tool end defining a tool bore into which a cutting tool may be inserted. The chuck body has an outer surface and the tool bore forms an inner surface. A cam is pivotally mounted to the chuck body and operably extends to the tool bore. An actuator cooperates with the chuck body and is positionable to operate the cam to secure or release the shank of a cutting tool inserted into the tool bore.

In a particularly preferred embodiment, a cam recess is formed into the inner surface of the tool bore and a threaded actuator bore is formed between the outer surface of the chuck body and the cam recess. In this particularly preferred embodiment, the cam has a lever end and a pivot end. The pivot end is rotatably mounted within the cam recess such that a force applied to the lever end will cause the cam to exert a camming force upon the shank of a cutting tool inserted into the tool bore. A threaded member is threaded into the threaded bore and operably engages the lever end of the cam such that rotation of the threaded member will cause the threaded member to press against or release the lever end, depending on the direction of rotation, and operate the cam.

In another embodiment of this invention, a collet is used and the cam exerts a camming force upon the collet, thereby clamping the shank of a cutting tool which has been inserted into the collet.

The advantages accruing to the present invention are numerous. For example, operation of the chuck requires only one simple step, adjustment of the actuator which can be made easily accessible. Because the shaft need not be secured against rotation in order to operate the cam, no shaft lock is required and only one tool is required to loosen or tighten the chuck. A further advantage is that, via the use of a cam, the cutting tool may be very securely retained with less user force required. Yet another advantage is that the clamping mechanism of the present invention will not simply fall out of the chuck when the cutting tool is removed. Furthermore, the mechanics of the present invention are fairly simple and may be easily and economically manufactured and assembled.

The above objects and other objects, features, and advantages of the present invention will be readily appreciated by one of the ordinary skill in the art from the following detailed description of the best mode for carrying out the invention when taken in connection with the accompanying drawings.

BRIEF DESCRIPTION OF THE DRAWINGS

FIG. 1 is an exploded view of various components of one embodiment of the improved chuck of the present invention and the shank of a conventional cutting tool;

FIG. 2 is a partially cut away side view of the one embodiment of the improved chuck with the cam member and set screw in place;

FIG. 3 is a sectional view taken along line 3—3 of FIG. 2; and

FIG. 4 is an exploded view of various components of a second embodiment of the improved chuck of the present invention which is very similar to the embodiment shown in FIG. 1 except that a collet is not used.

BEST MODE FOR CARRYING OUT THE INVENTION

As illustrated in FIGS. 1, 2 and 3, one embodiment of the improved chuck of the present invention includes a chuck body 10, a cam 12, and a set screw 14. This embodiment is used in conjunction with a collet 16 for supporting the shank 18 of a cutting tool 20. Because collets are generally well known in the art, no further explanation will be provided here.

The external configuration of the chuck body 10 may be of any size or shape and may be manufactured a single piece of metal. The chuck body 10 has a tool end 22 and a drive end 24.

The tool end 22 of the chuck body 10 is provided with an aperture 26 having an inner surface 28 into which the collet 16 and the shank 18 of a cutting tool 20 can be inserted.

As shown in FIG. 2, the drive end 24 of the chuck body 10 is provided with a threaded drive bore 30 for connecting the chuck body 10 to mating threads of a shaft of a driving apparatus (not shown) which may comprise a power drive unit or a manual drive device both of which are generally well known in the art and require no further explanation here. A pilot bore 32 is also provided as known in the art for maintaining concentricity and good run out characteristics with regard to the shaft of the driving apparatus.

In the preferred embodiment shown, the aperture 26, the threaded drive bore 30 and the pilot bore 32 form a throughbore along the central axis of the chuck body.

As shown in FIGS. 1 and 3, the chuck body 10 is also provided with a cam recess comprising a T-slot 34 in the inner surface 28 of the aperture 26. As shown, the T-slot 34 extends from the tool end 22 to a point short of the threaded drive bore 30. A T-slot could alternatively be provided extending from the drive end 24 of the chuck body 10 to a point short of the tool end 22. The T-slot 34 is designed to retain the cam 12 in an operational position as described below.

The cam 12 may be manufactured from a single piece of metal such as a high carbon steel or a titanium metal-containing alloy. Preferably, the cam 12 is formed using a powder metal process. However, the cam 12 could also be machined from bar stock or made using any other suitable metal forming technology.

As shown in FIGS. 1 and 2, the cam 12 has a lever end 36, a pivot end 38, a camming face 40, and a sloped face 42.

As shown in FIGS. 1, 2 and 3, the pivot end 38 of the cam 12 has a semi-cylindrical pivot 44 which slides into and along the T-slot 34. While in such position the cam 12 may be rotated about the axis of the semi-cylindrical pivot 44 such that the camming face 40 will come into contact with and clamp against the collet 16 inserted into the aperture 26 thereby clamping the shank 18 of the cutting tool 20 which has been inserted into the collet 16. A stop extension, which in this embodiment comprises wing extensions 45 which extend from the semi-cylindrical pivot 44, engages the T-slot 34 to prevent the lever end 36 from rotating into the aperture 26 when the collet 16 is removed. The wing extension 45 thereby prevents the lever end 36 from interfering with the insertion of the same or another collet 16. The sloped face 42 is provided to facilitate insertion of the collet 16 into the aperture 26.

The semi-cylindrical pivot 44 of pivot end 38 could alternatively comprise two aligned cylindrical axles which could be slid into the T-slot 34. However, with such a design the lever end would then be free to rotate into the aperture 26. Therefore, in the event two aligned cylindrical axles are used, it would be desirable to provide a stop extension comprising at least one stop pin, extending from the lever end and engaging the T-slot 34, to allow the cam to operably rotate while preventing the lever end from rotating into the aperture 26.

The chuck body 10 is also provided with a threaded actuator bore 46 which intersects the T-slot 34 and, as shown, is perpendicular to the central axis of the aperture 26. The cam 12 may be adjusted via an actuator which in the embodiment shown comprises a threaded member, such as a set screw 14 which is threadably screwed into the threaded actuator bore 46 such that the head 48 of the set screw 14 is left exposed for adjustment. The head 48 of the set preferably has a hex head socket drive so that the set screw 14 may be adjusted without any need to lock to the shaft of the driving apparatus and while using only one tool, an allen wrench. Another advantage to using a hex head socket drive is that the head 48 may be operated while below the exterior surface of the chuck body 10. The other end of the set screw 14 abuts the lever end 36 of the cam 12 where a step stop 50 is provided. The step stop 50 prevents the cam 12 from sliding out of the T-slot 34 when the set screw 14 is loosened and the collet 16 is removed from the chuck.

The dimensions of the set screw 14 are preferably such that the head 48 remains below the exterior surface of the chuck body 10 when the set screw 14 is adjusted to release the collet 16 from the cam 12. To prevent the set screw 14 from being ejected from the chuck body 10 during operation of the tool the chuck body 10 in a region 52 adjacent the threaded actuator bore 46 is staked, using a press, after the cam 12 and set screw 14 have been installed. The staking operation is performed to deform the lead-in thread of the threaded actuator bore 46 thereby preventing removal or ejection of the set screw 14 from the chuck body 10.

The chuck body 10 is preferably formed at near net shape using a powder metal process. The aperture 26, threaded drive bore 30, pilot bore 32 and threaded actuator bore 46 may then be machined and threaded as required. The exterior surface of the chuck body 10 and the T-slot 34 may be left in an as-formed condition or may be finished if desired. As a result, one ends up with a very precise chuck with minimal machining. Alternatively, the chuck body 10 may be machined from bar stock, cold headed or manufactured using any other appropriate metal forming techniques.

If this chuck invention is to be operated at high speeds, it is also preferable to balance the chuck body 10 along its central longitudinal axis. Thus it may be desirable to form the chuck body 10 with a groove or hollow on the side of the chuck body opposite the T-slot 34 such that the chuck body 10 is balanced. It would also be possible to machine such a groove or hollow after forming the chuck body 10.

The collet 16 may consist of any appropriate or standard collet known in the art such as the collet shown in U.S. Pat. No. 5,096,212 to Walsh. As shown in FIG. 1, the collet 16 comprises a cylindrical member 54 having a longitudinal bore 56 and a flange 58. Longitudinal slots 60 and 62 extend alternately from either end of the collet 16 to a point short of the opposite end thereby allowing the collet 16 to be flexibly compressed. While three longitudinal slots 60 and three longitudinal slots 62 are indicated, a lesser or greater number could be used.

An alternative embodiment of the invention, as shown in FIG. 4, is identical to the embodiment as illustrated in FIGS. 1, 2 and 3 except that a collet is not used. The use of a collet is preferable because a user may wish to use cutting tools having shanks of different sizes in which case the collet can be changed accordingly. Instead, in this alternative embodiment, the cam 112 is adjusted via the set screw 114 such that the camming face 140 will come into contact with and clamp directly against the shank 118 of the cutting tool 120 inserted into the aperture 126. Thus the cutting tools used with this embodiment are limited to those having the same shank size and configuration adapted for use in the aperture 126 of the chuck body 110.

It is also understood, of course, that while the forms of the invention shown and described constitute preferred embodiments, they are not intended to illustrate all possible forms of the invention. Furthermore, while this invention would be primarily used in conjunction with high speed power tools, such as routers, it can also be used with lower speed power or hand tools, such as hand or power drills. It will also be understood that the words used are words of description rather than limitation, and that various changes may be made without departing from the spirit and scope of the invention disclosed.

What is claimed is:

1. A chuck for holding a tool having a shank while being rotated by a driving apparatus, the chuck comprising:
   a chuck body having an outer surface, a drive and for attaching the chuck body to the driving apparatus, and a tool end defining a tool bore into which the tool shank may be inserted, the tool bore having an inner surface;
   a cam pivotally mounted to the chuck body and having a cam surface operably extending to the tool bore; and
   a threaded actuator cooperating with the chuck body and rotatably positionable to operate the cam such that only the force of the cam surface against the tool shank will secure or release the tool within the tool bore.

2. The chuck of claim 1 further comprising:
   a cam recess formed into the inner surface of the tool bore and in which the cam is pivotally mounted.

3. The chuck of claim 2 wherein the cam comprises:
   a lever end and a pivot end, the pivot end being rotatably mounted within the cam recess such that a force applied to the lever end will cause the cam to exert a camming force upon the tool shank within the tool bore.

4. The chuck of claim 3 further comprising:
   a threaded actuator bore running between the outer surface of the chuck body and the cam recess.

5. The chuck of claim 4 wherein the actuator comprises:
   a threaded member threadably engaging the threaded actuator bore and operably engaging the lever end of the cam such that rotation of the threaded member will cause the threaded member to press against or release the lever end of the cam depending on the direction of rotation.

6. The chuck of claim 3 wherein the cam recess comprises:
   a T-slot formed into the inner surface of the tool bore from the tool end of the chuck body to the cam recess such that the pivot end of the cam member may be slid along the T-slot from the tool end to an operational position within the T-slot.

7. The chuck of claim 3 wherein the cam recess comprises:
   a T-slot formed into the inner surface of the tool bore from the drive end of the chuck body such that the pivot end of the cam member may be slid along the T-slot from the drive end to an operational position within the T-slot.

8. The chuck of claim 1 further comprising a threaded drive bore and a pilot bore defined by the drive end of the chuck for attaching the chuck body to the driving apparatus.

9. The chuck of claim 3 further comprising a stop extension connected to the cam and engaging the cam recess so as to allow the cam to operably rotate while preventing the lever end from rotating into the tool bore.

10. A chuck for holding a tool within a collet while being rotated by a driving apparatus, the chuck comprising:
    a chuck body having an outer surface, a drive end for attaching the chuck body to the driving apparatus, and a tool end defining a collet bore into which the collet may be inserted, the collet bore having an inner surface;
    a cam pivotally mounted to the chuck body and having a cam surface operably extending to the collet bore; and
    a threaded actuator cooperating with the chuck body and rotatably positionable to operate the cam such that the force of the cam surface against the collet will secure or release the collet, and the tool inserted into the collet, within the collet bore.

11. The chuck of claim 10 further comprising:
    a cam recess formed into the inner surface of the collet bore and in which the cam is pivotally mounted.

12. The chuck of claim 11 wherein the cam comprises:

a lever end and a pivot end, the pivot end being rotatably mounted within the cam recess such that a force applied to the lever end will cause the cam to exert a camming force upon the collet, and therefore upon the tool inserted into the collet, within the collet bore.

13. The chuck of claim 12 further comprising:
a threaded actuator bore running between the outer surface of the chuck body and the cam recess.

14. The chuck of claim 13 wherein the actuator comprises:
a threaded member threadably engaging the threaded actuator bore and operably engaging the lever end of the cam such that rotation of the threaded member will cause the threaded member to press against or release the lever end of the cam depending on the direction of rotation.

15. The chuck of claim 12 wherein the cam recess comprises:
a T-slot formed into the inner surface of the collet bore from the tool end of the chuck body such that the pivot end of the cam member may be slid along the T-slot from the tool end to an operational position within the T-slot.

16. The chuck of claim 12 wherein the cam recess comprises:
a T-slot formed into the inner surface of the collet bore from the drive end of the chuck body such that the pivot end of the cam member may be slid along the T-slot from the drive end to an operational position within the T-slot.

17. The chuck of claim 10 further comprising a threaded drive bore and a pilot bore defined by the drive end of the chuck for attaching the chuck body to the driving apparatus.

18. The chuck of claim 12 further comprising a stop extension connected to the cam and engaging the cam recess so as to allow the cam to operably rotate while preventing the lever end from rotating into the tool bore.

19. A chuck for holding a tool having a shank which is attached to a driving apparatus, the chuck comprising:
a chuck body defining a tool bore into which the tool shank may be inserted;
a cam pivotally mounted to the chuck body and having a cam surface operably extending to the tool bore; and
a threaded actuator cooperating with the chuck body and rotatably positionable to operate the cam such that only the force of the cam surface against the tool shank will secure or release the tool within the tool bore.

20. A chuck for holding a tool within a collet and which is attached to a driving apparatus, the chuck comprising:
a chuck body defining a collet bore into which the collet may be inserted;
a cam pivotally mounted to the chuck body and having a cam surface operably extending to the collet bore; and
a threaded actuator cooperating with the chuck body and rotatably positionable to operate the cam such that the force of the cam surface against the collet will secure or release the collet, and the tool inserted into the collet, within the collet bore.

* * * * *

UNITED STATES PATENT AND TRADEMARK OFFICE
CERTIFICATE OF CORRECTION

PATENT NO.    :   5,348,319
DATED         :   September 20, 1994
INVENTOR(S)   :   J. TIMOTHY STOLZER It is certified that error appears in the above-identified patent and that said Letters Patent is hereby corrected as shown below:

Column 1, Line 62

Delete "after" and insert --After--.

Column 5, Line 57

After "drive" delete "and" and insert --end--.

Signed and Sealed this

Twenty-fourth Day of January, 1995

Attest:

BRUCE LEHMAN

Attesting Officer          Commissioner of Patents and Trademarks